United States Patent
Fyson et al.

[15] 3,661,157
[45] May 9, 1972

[54] INHIBITED DEMAND PACER WITH A TWO-RATE PULSE GENERATOR

[72] Inventors: John William Fyson, Newbury; John Raymond Truscott, Reading; George Edgar Sowton, London, all of England

[73] Assignee: National Research Development Corporation, London, England

[22] Filed: Apr. 16, 1970

[21] Appl. No.: 29,016

[30] Foreign Application Priority Data

Apr. 16, 1969 Great Britain..................19,547/67

[52] U.S. Cl. ..........................................128/419 P
[51] Int. Cl. ..........................................A61n 1/36
[58] Field of Search ..................128/419 P, 421, 422

[56] References Cited

UNITED STATES PATENTS 3,528,428  9/1970  Berkovits.........................128/419 P
3,431,912  3/1969  Keller, Jr.........................128/419 P Primary Examiner—William E. Kamm
Attorney—Cushman, Darby & Cushman

[57] ABSTRACT

In a pacer for artificial heart stimulation, the stimulating pulses produced are inhibited when the pacer detects that natural heartbeats are present. If the pacer detects electrical pulses at a frequency higher than a predetermined threshold frequency, resulting from external interference, the inhibition is suspended, and stimulating pulses are supplied. When interference is detected, the pacer may be arranged to generate stimulating pulses at a frequency higher than normal to avoid the possibility of the artificial pulses competing with natural stimulating pulses.

16 Claims, 7 Drawing Figures

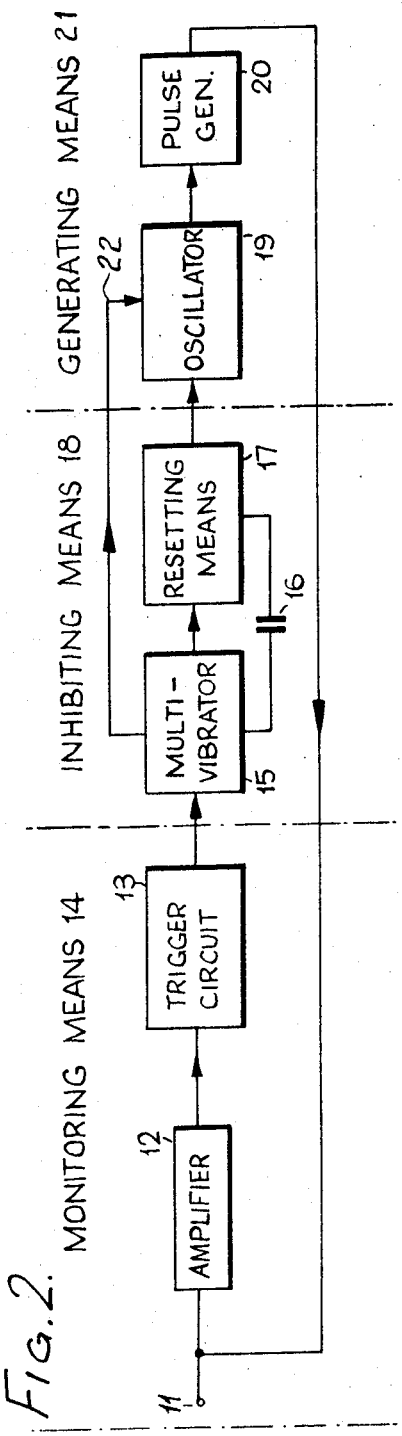

FIG. 1.

| INPUT DETECTOR | STATE OF PACER | RESULTING ACTION | CONDITION |
|---|---|---|---|
| High frequency interference | Inhibitions suspended | Stimulation at high frequency | A |
| Natural Heartbeats | Inhibited | No artificial stimulation | B |
| Low frequency Heartbeats | Not inhibited | Stimulation at normal frequency | C |
| No heartbeat | Not inhibited | Stimulation at normal frequency | D | second frequency threshold →
first frequency threshold →

FIG. 2.

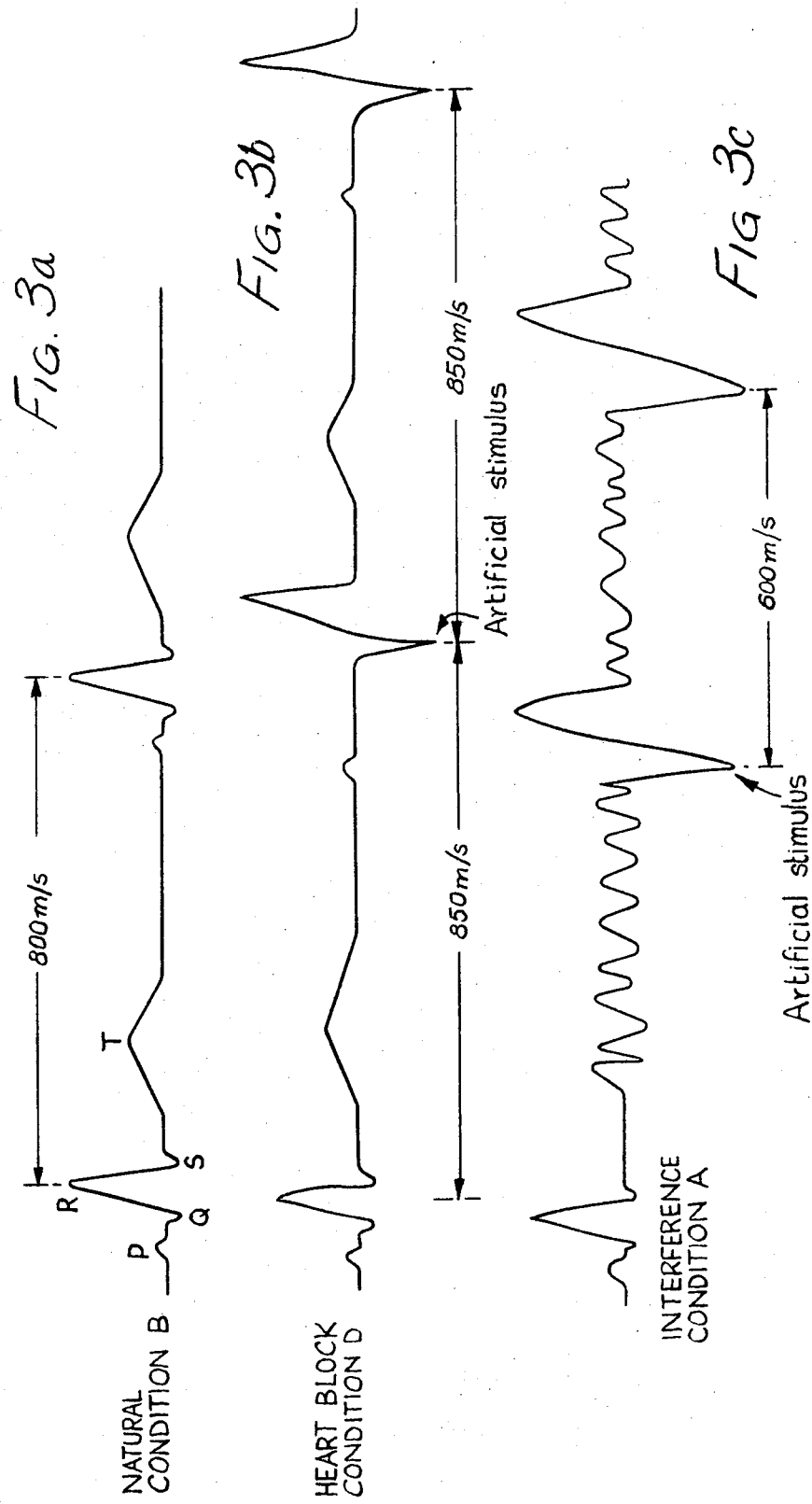

3,661,157

INHIBITED DEMAND PACER WITH A TWO-RATE PULSE GENERATOR

This invention relates to pacer for heart stimulation, and in particular to pacer which are sometimes known as inhibited demand pacer.

Pacer are used in heart disease where the nerve bundle linking the atrium and the ventricle becomes diseased with the result that spontaneous signals from the former which normally stimulate the pumping action of the latter are not received, or are received only intermittently. The pacer is an electronic circuit, usually implanted in the body, which provides electrical stimulating pulses, usually to the ventricle, as a substitute for the spontaneous signals from the atrium. Connections are usually made by the endocardial method, in which a first electrode is fed to the right ventricle via the jugular or other vein, the vena cava, and the right atrium, and a second ("earth return") electrode, known as the indifferent electrode, is connected to the body tissue elsewhere.

In known inhibited demand pacer, the pacer produces stimulating pulses only when spontaneous signals are absent, in order to avoid undesirable competition between spontaneous and pacer-produced stimuli. The aforementioned first electrode acts as both an input and an output connection. The pacer receives the electrical input signal produced by the heart at each contraction of the ventricle, and in the absence of a spontaneous signal generates a stimulating pulse a fixed time thereafter, e.g. 850 msec thereafter, corresponding to a normal heart rate of 70/min. Should a spontaneous signal due to natural heart action be received before this time has elapsed however, no stimulating pulse is generated, i.e. the stimulating pulse is "inhibited". The pacer generates a stimulating pulse 850 msec after such inhibition, unless a further spontaneous signal is received within that time, and so on.

A disadvantage of such inhibited demand pacer is that electrical interference from the environment may be picked up by the pacer, which may react as if the interference signals were spontaneous heart stimuli. In such circumstances such pacer may thus cease to generate stimulating pulses, even though spontaneous stimuli are absent. It is an object of the present invention to provide an inhibited demand pacer which alleviates this dangerous possibility.

According to the present invention there is provided an inhibited demand pacer comprising means for generating stimulating pulses suitable for stimulating heartbeats, means for monitoring natural heartbeats by detecting electrical impulses, and means for inhibiting the generating means during detection of electrical impulses above a first threshold frequency and below a second threshold frequency.

The pacer may be arranged to generate stimulating pulses at a normal stimulating frequency in the absence of input signals at or below the first threshold frequency, and to generate stimulating pulses at a higher warning frequency when input signals are received above the second threshold frequency at which inhibition ceases. Thus the generating means may be such that in the absence of detection of electrical impulses at frequencies higher than the first threshold frequency, the generating means generates stimulating pulses at a first, normal, stimulating frequency, and, in response to detection by the monitoring means of electrical impulses above the second threshold frequency, the generating means generates stimulating pulses at a second stimulating frequency higher than the first, normal stimulating frequency.

This change to a higher fixed frequency when inhibition ceases, e.g. to 100/min as compared with a normal fixed frequency of 70/min, prevents competition with natural heart action, and warns the user that he is in the presence of electrical interference.

Suitably the second threshold frequency at which inhibition ceases is made in the range 200 to 400 pulses/min, and preferably is about 300 pulses/min, since very little electrical interference encountered has substantial components below that frequency, and it is unlikely that the natural heart rate will exceed that value. The first threshold frequency may be in the range 55 to 75 pulses per minute, the normal stimulating frequency may be in the range 65 to 75 pulses per minute and the warning stimulating frequency may be in the range 95 to 110 pulses per minute. The first threshold frequency may be equal to the normal stimulating frequency.

The monitoring means may include an amplifier for passing a selected frequency bandwidth of the natural heartbeat electrical waveform, and a trigger circuit for triggering the inhibiting means in response to detection of a predetermined feature of the heartbeat waveform.

A pacemaker according to the invention may be provided in which the generating means includes an oscillator having a periodic cycle at the end of which a stimulating pulse is generated, and in which the inhibiting means includes means for resetting the oscillator back to the commencement of its said periodic cycle to prevent the generation of a stimulating pulse.

The inhibiting means may include a monostable multivibrator connected to be triggered from its quiescent state to its on state by the detection of an electrical impulse by the monitoring means, the output of the multivibrator being fed to the resetting means to operate the resetting means upon switching of the multivibrator from one state to another. The construction and period of the multivibrator may be such that the detection of electrical impulses by the monitoring means above the second frequency threshold maintains the multivibrator in its on state to suspend operation of the resetting means.

The inhibiting means may include means responsive to the multivibrator being maintained in the on state longer than a predetermined time interval, and operative upon occurrence of such a state to feed to the generating means a frequency shift signal causing the generating means to generate stimulating pulses at the said higher stimulating frequency.

The generating means may include two capacitive elements, means for transferring charge into or out of the capacitive elements at a substantially constant rate, two devices connected to transfer substantially instantaneously charge out of or into the capacitive elements depending upon the sense of transfer provided by the said transferring means, and means for isolating one of the capacitive elements, one of the devices being arranged to conduct when the charge across one of or a combination of the capacitive elements reaches a predetermined level and by such conduction to cause the generation of a stimulating pulse, and the other device being connected to receive the output of the resetting means and being arranged to conduct on receipt of a signal from the resetting means, the means for isolating one of the capacitors operating during detection by the monitoring means of impulses above the second threshold frequency in such a manner as to produce discharge of the non-isolated capacitive element at the said, higher, warning frequency.

Embodiments of the invention will now be described by way of example with reference to the accompanying drawings, in which:

FIG. 1 is a table illustrating different conditions of operation of an inhibited demand pacer embodying the invention;

FIG. 2 is a block circuit diagram of a pacer embodying the invention;

FIG. 3a, 3b and 3c shows respectively waveforms illustrating the operation of the pacemaker of FIG. 2;

Referring to FIG. 1 there is shown a table indicating four possible conditions under which an inhibited demand may have to operate and showing how the four resulting actions required are obtained with a pacer embodying the invention. In condition D no natural heartbeats occur and the heart is required to be stimulated at a normal stimulating frequency of for example 70 pulses per minute. In condition C low frequency heartbeats would be present in the absence of artificial stimulation, and stimulation at the normal frequency is required. With such stimulation, the slow natural beats are forced into step with the stimulating pulses. In condition B natural heartbeats are detected above a first frequency threshold of for example 70 pulses per minute, and below a second frequency threshold of for example 300 pulses per minute. Here, no artificial stimulation is required. In condition A, high frequency interference impulses are detected above the second frequency threshold, and artificial stimulation is required. In the present invention, the stimulating frequency in condition A may be increased above the normal frequency to avoid competition with natural heartbeats and to give a warning of the presence of inteference. In conditions D, C and A a pacer embodying the invention is not inhibited, and in condition B it is inhibited.

Figure 4:
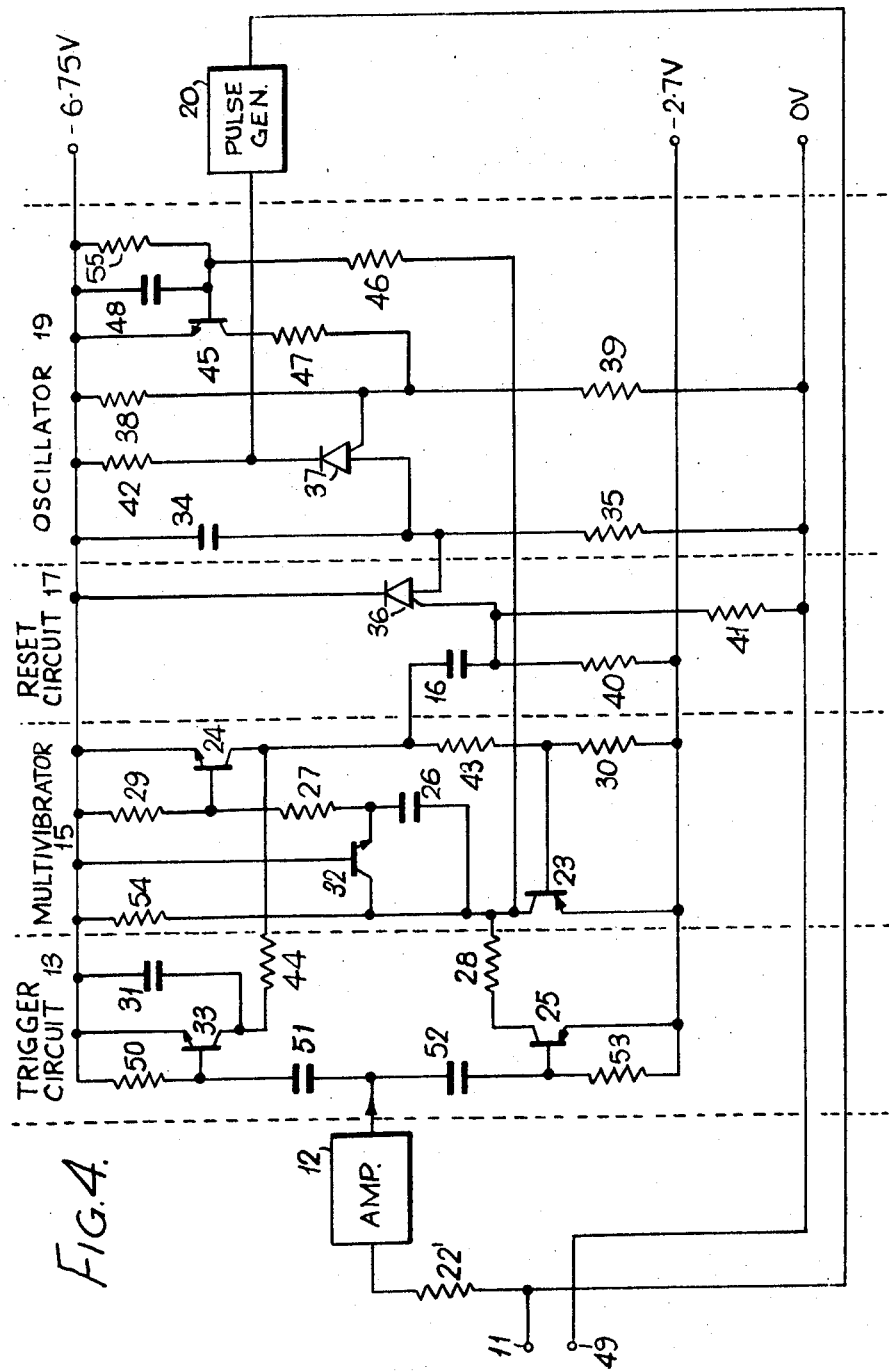
FIG. 4 is a circuit diagram of one detailed embodiment of the invention.
Figure 5:
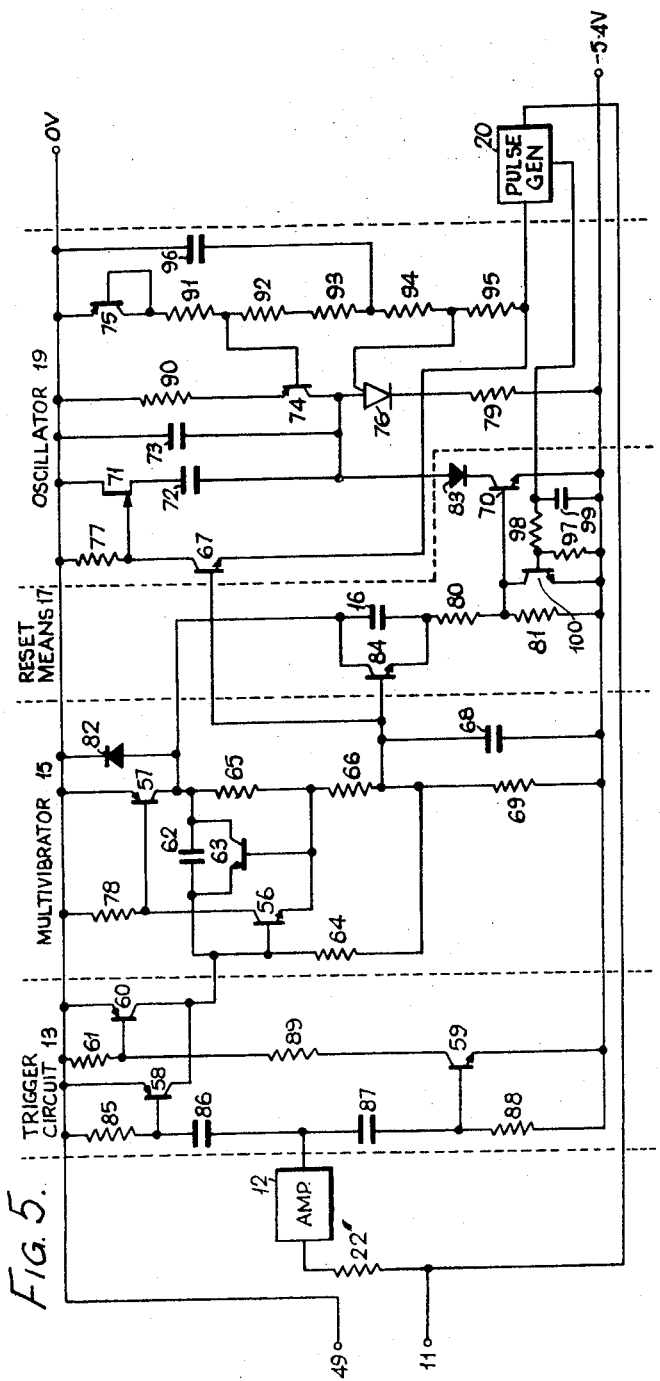
FIG. 5 is a circuit diagram of another detailed embodiment of the invention.

In FIG. 2 there is shown a block circuit diagram of a pacer embodying the invention, and illustrating the operation of both the alternative embodiments shown in detail in FIGS. 4 and 5. FIG. 3 shows in diagrammatic form the timing of natural heartbeats and artificial stimulating pulses in different situations.

Referring to FIG. 2, a terminal 11 is connected in use to an electrode inserted into the right ventricle, and serves both as an input terminal to monitor natural heartbeats, and as an output terminal to feed stimulating pulses to the heart. Pulses received at the terminal 11 are passed to an amplifier 12 the output of which is fed to a trigger circuit 13. The amplifier 12 and trigger circuit 13 form part of monitoring means 14 for monitoring natural heartbeats.

The trigger circuit output passes to a monostable multivibrator 15 linked by a capacitor 16 to a resetting circuit 17, the elements 15, 16 and 17 forming an inhibiting means 18 for inhibiting the generation of stimulating pulses. The resetting circuit 17 is connected to an oscillator 19 which has a periodic cycle at the end of which a triggering pulse is fed to a pulse generator 20 for generating pulses to stimulate heart action. The oscillator 19 and pulse generator 20 form generating means 21.

The overall operation of the pacer is as follows. In condition D, in the absence of natural heartbeats the oscillator 19 is free running at a normal frequency of 70 pulses per minute, and these pulses trigger the pulse generator 20 to feed stimulating pulses to the terminal 11. In condition C where low frequency natural heartbeats would occur in the absence of stimulation, the oscillator 19 continues to be free running and synchronizes the natural heartbeats to the normal stimulating frequency of 70 pulses per minute.

In condition B, the E.C.G. wave of a natural heartbeat is amplified in the amplifier 12 which passes the R-wave portion to the trigger circuit 13 which in turn triggers the multivibrator 15. The change to the on state of the multivibrator triggers the resetting circuit 17 by way of the capacitor 16, and the resetting circuit 17 resets the oscillator 19 back to the commencement of its periodic cycle to suspend triggering of the pulse generator 20.

In condition A there are received at the terminal 11 a series of high frequency interference pulses. These cause the trigger circuit 13 to trigger the multivibrator 15 at such a rate that it is held continuously in the on state. No signals are passed through the AC link of the capacitor 16 so that the resetting circuit 17 does not reset the oscillator 19, and stimulating pulses are produced by the pulse generator 20. After the multivibrator 15 has been held on for a predetermined interval of time (preferably less than the periodicity of the oscillator 19), a frequency shift signal is fed along a connection 22 to the oscillator 19. This signal causes the oscillator 19 to trigger the pulse generator 20 at an increased frequency of for example 100 pulses per minute for the duration of the interval during which condition A persists.

FIG. 3a shows a typical E.C.G. waveform for a natural heart beat, the monitoring means being arranged to detect the R-wave portion. FIG. 3b shows an E.C.G. waveform where a heart block exists and no natural heartbeats occur, and where an artificially applied stimulating pulse is applied as in known inhibited demand pacers. After the period of a natural heartbeat 850 ms has elapsed with no natural stimulation, the pacer provides a pulse which stimulates a normal E.C.G. wave. In a known pacer the stimulating pulse would be inhibited if an electrical pulse were detected within 850 msec of the previous pulse.

FIG. 3c illustrates condition A where high frequency interference pulses commence after a natural heartbeat. In a known inhibited demand pacer such a condition would inhibit the generation of a stimulating pulse, but in an embodiment of the present invention stimulating pulses are provided at an increased frequency.

In FIGS. 4 and 5, elements corresponding to elements of FIG. 2 are indicated by like reference numerals. The terminal 11, which is connected in use to an electrode inserted into the right ventricle, is connected via a blocking resistor 22' to an amplifier 12. The latter is of conventional design and has a frequency response of −18 db/octave below 15 c/s and −18 db/octave above 150 c/s, and a voltage gain of about 600. This response causes the amplifier to accept the input from the R-wave portion of an E.C.G. cardiac signal, whose components are of relatively high frequency (20–100 c/s), but to reject the input from the succeeding T-wave portion of the cardiac signal, whose components are of relatively low frequency (2.5 c/s). It is undesirable, for reasons known in the medical art, that stimulating pulses should be initiated by the T-wave portion. maintained, the The R-wave signal, and hence the output of the amplifier 12, can be a pulse of either polarity, which triggers the monostable multivibrator 15 formed by complementary transistors 23 (p-n-p) and 24 (n-p-n). In the quiescent state, both transistors are biassed off, an arrangement which economizes in battery current. When the pulses from the amplifier 12 are negative, the multivibrator is triggered via a transistor 25, which is normally biassed off. The latter bottoms on application of a negative input pulse, and the collector of the transistor 25 goes positive to turn on the transistor 24 by way of a resistor 28, a capacitor 26 and a resistor 27. This drives the base of the transistor 23 negative and the transistor turns hard on, its collector bottoming to the −2.7V line. The resistor 28 prevents a prolonged input signal interfering with the triggering action. The capacitor 26 which was initially uncharged, now charges through resistors 29 and 27 until the current through the resistor 29 falls below the value which develops sufficient potential across the resistor 29 to keep the transistor 24 in conduction (about 0.5V). When the transistor 24 current begins to fall, the current in the transistor 23 likewise falls and both transistors revert to the quiescent state by cumulative action.

In the absence of a capacitor 31 (whose effect is described hereafter), the collector of the transistor 23 remains at −2.7V for a time determined by the charging time of the capacitor 26, which is about 15 msec with the component values to be given hereinafter. The capacitor 26 is discharged rapidly thereafter (in about 1 msec) through a transistor 32 which is turned hard on when its emitter is driven negative via the capacitor 26 by the rear edge of the collector waveform of the transistor 23.

When the pulses from the amplifier 12 are positive, the multivibrator is triggered via a transistor 33, which bottoms to drive the transistor 23 base negative and so turn the transistor 23 on.

A capacitor 34 connected in series with a resistor 35 and in parallel with a first discharge device transistor 37 form a sawtooth oscillator 19. A second discharge device 36 forms a resetting circuit 17 for the oscillator. Transistors 36 and 37 are silicon controlled switches also known as programmable unijunction transistors (PUT) having anode, cathode and gate electrodes. The capacitor 34 charges through the resistor 35 to the voltage at which either PUT conducts spontaneously, which voltage is reached when its anode is about 0.6V more positive than its gate, and then discharges rapidly through the anode-cathode path. Thus a sawtooth waveform is produced across the capacitor 34. Whether the transistor 36 or 37 discharges the capacitor 34 depends on which gate is the more negative.

Under free-running conditions the capacitor 34 is discharged by the transistor 37, since its gate is held at −3.4V by a resistor 38 and a resistor 39 while the transistor 36 gate is held at −2.1V via a resistor 40 and a resistor 41. This gives a sawtooth duration of about 860 msec, corresponding to 70/min. The voltage excursion on the capacitor 34 is between about −2.8V and −6.2V. At the end of each sawtooth the discharge current of the capacitor 34 produces a pulse across a resistor 42 which triggers a pulse generator 20. The output of the latter is fed to the terminal 11 and hence to the heart electrode to stimulate ventricle contraction. Thus in the absence of input pulses from amplifier 12, or if the pulses occur at less than 70/min (that is to say in condition C or D), output pulses are generated at 70/min.

If, during a sawtooth, an input pulse is received which triggers the multivibrator, the transistor 24 collector goes negative by about 4V, thus momentarily driving the transistor 36 gate, via the differentiating circuit of the capacitor 16 and the resistor 40 from −2.1 to about −6V. The capacitor 34 therefore discharges through the transistor 36 before the end of the free-running sawtooth, and no pulse is produced across the resistor 42 to trigger the generator 20. Thus the pacer output is inhibited if spontaneous heart stimuli are produced at 70/min or faster. The resistor 41 connects the transistor 36 gate to the most positive line (OV) in order to ensure that if one of the three batteries connected between the −6.75 and −2.7V lines should fail, the transistor 37 continues to control the output pulse rate in the absence of input pulses.

Should the input pulse rate equal or exceed 200/min (condition A), the circuit operates as follows. In the quiescent state the transistor 24 is non-conducting and the capacitor 31 is charged to 4V between the −2.7 and −6.75V lines. Assuming a positive input pulse to the transistor 33 the capacitor 31 discharges therethrough in about 2.5 msec, which is much less than the duration of the R-wave. Thus the presence of the capacitor 31 does not affect the triggering action. The capacitor 31 remains discharged for the 15 msec during which the transistor 24 is conducting. Thereafter the capacitor 31 recharges through the resistor 44, a resistor 43 and the resistor 30, and the base current of the transistor 23, and the transistor 23 therefore remains conducting for a period of about 285 msec after the transistor 24 has turned off. The transistor 23 collector thus remains at −2.7V for about 300 msec and provides an oscillator control signal.

A negative input pulse has a similar effect. The transistor 24 conducts as previously described, and starts to discharge the capacitor 31 through resistor 44. The capacitor 31 is further discharged when the transistor 33 is turned on by the negative-going rear edge of the R-wave. The capacitor 31 thereafter recharges as described.

The transistor 23 collector is connected to a transistor 45 base via a resistor 46. The transistor 45 is normally biassed off, but is turned on for the 300 msec during which transistor 23 collector is at −2.7V. While the transistor 45 is on, a resistor 47 is effectively in parallel with the resistor 38, and the transistor 37 gate is therefore held at a voltage of about −4.1V, which is more negative than its usual −3.4V. This would reduce the sawtooth period from 850 msec to about 600 msec, corresponding to 100 output pulses/min, except that the transistor 37 returns to −3.4V after 300 msec, so that the 850 msec period prevails. However should a further pulse appear within the 300 msec period (15 msec + 285 msec) during which the transistor 23 remains on, the transistor 23 will remain on for a further 285 msec from the arrival of this further pulse. Thus the transistor 23 remains on if ensuing pulses have a periodicity of less than 285 msec (approx. 200/min). While the transistor 23 remains on, the transistor 37 gate remains at −4.1V, and the pulse generator 20 produces output pulses at 100/min.

A capacitor 48 and the resistor 46 form a delay circuit which prevents the transistor 37 conducting before the transistor 36 in circumstances where they could conduct together. This could produce an unwanted output pulse from generator 20 when the heart was operating spontaneously at the normal rate of about 70/min.

The PUT transistor 36 can be replaced by for example a complementary transistor pair, since it is not required to conduct spontaneously at a given voltage on the capacitor 34, but a PUT is preferred because of its low leakage current.

The pulse generator 20 comprises an economical complementary monostable multivibrator circuit similar to the basic transistor 23-transistor 24 circuit, which is triggered via a diode connected between the resistor 42 and the base of an n-p-n transistor corresponding to the transistor 24. Its output pulse of about 1 msec duration is fed via a transistor current amplifier to a transistor switch which feeds a pulse of about 25 microjoules to the terminal 11. Other forms of pulse generator can be used.

A terminal 49 is the aforementioned indifferent electrode which is connected to tissue elsewhere on the body.

It will be noted that the delay introduced by the capacitor 31 prevents inhibition of the output pulse during the first 300 msec of the 850 msec period following each stimulated or spontaneous contraction of the ventricle, but this is acceptable from the medical point of view.

Other circuit elements such as biassing elements are indicated by reference numerals 49 to 55. Values which may be used for the components of FIG. 4 are given by way of example in the following table.

| Reference Numerals | Value or Type |
| --- | --- |
| 16 | 0.001 microfarad |
| 23 | 2N3962 p-n-p low level transistor |
| 24 | 2N2484 n-p-n low level transistor |
| 25 | 2N3962 p-n-p low level transistor |
| 26 | 0.0068 microfarad |
| 27 | 1 M.ohm |
| 28 | 1 M.ohm |
| 29 | 1.2 M.ohm |
| 30 | 680 K.ohm |
| 31 | 0.18 microfarad |
| 32 | 2N2484 n-p-n low level transistor |
| 33 | 2N2484 n-p-n low level transistor |
| 34 | 0.1 microfarad |
| 35 | 10 M.ohm |
| 36 | D13T2 p-n-p-n silicon control switch |
| 37 | D13T2 p-n-p-n silicon control switch |
| 38 | 2.2 M.ohm |
| 39 | 2.2 M.ohm |
| 40 | 1 M.ohm |
| 41 | 3.3 M.ohm |
| 42 | 1 K. ohm |
| 43 | 650 K.ohm |
| 44 | 1.5 M.ohm |
| 45 | silicon controlled switch |
| 46 | 3.3 M.ohm |
| 47 | 3.9 M.ohm |
| 48 | 0.01 microfarad |
| 50 | 2.7 M.ohm |
| 51 | 0.01 microfarad |
| 52 | 0.01 microfarad |
| 53 | 2.7 M.ohm |
| 54 | 560 K.ohm |
| 55 | 820 K.ohm |

There will now be described with reference to FIG. 5 an alternative embodiment of the invention which is particularly suitable for fabrication by thick film techniques. This is achieved by the avoidance of high value resistive components. Elements common to FIGS. 2 and 5, and 4 and 5 are indicated by like reference numerals.

The R-wave signal, and hence the output of the amplifier 12, can be a pulse of either polarity, which triggers the monostable multivibrator 15 (formed by two complementary transistors 56 (n-p-h) and 57 (p-n-p) by means of the trigger circuit 13 comprising transistors 58, 59 and 60. In the quiescent state both the transistors 56 and 57 are biassed off, an arrangement which economizes in battery current. When the pulses from the amplifier 12 are negative, the multivibrator is triggered by transistor 58, which is normally biassed off.

The transistor 58 bottoms on application of a negative input pulse, the transistor 56 conducts and bottoms and draws current through a resistor 78 and the base of the transistor 57. This causes current to flow in the collector of the transistor 57 and this transistor bottoms. The two transistors 56 and 57 of the multivibrator are coupled by a capacitor 62 in parallel with a transistor 63. While the negative input signal exists from the amplifier 12, the charge on the capacitor 62 remains substantially zero, as it is connected across the collectors of the bottomed transistors 58 and 57. On cessation of the signal from the amplifier 12, the transistor 58 switches off and the capacitor 62 begins to charge through a resistor 64, so causing the base, and hence the emitter, potential of the transistor 56 to fall steadily negatively. A point in time is reached when the emitter potential of the transistor 56 approaches that set by a potentiometer network formed by a resistor 65 and a resistor 66, when the predominant current through the resistor 66 is due to the still bottomed transistor 57. At this point, the current of the transistor 56 now rapidly decreases, as the capacitor 62 continues to charge, and insufficient current is maintained through a biassing resistor 78 and the base of the transistor 57 to keep the transistor 57 bottomed. The collector of the transistor 57 starts to fall negatively causing the base of the transistor 56 to go further negative by the coupling through the capacitor 62. This produces a cumulative action and both transistors 56 and 57 revert to their original quiescent state.

The time for which the transistor 56 and the transistor 57 are held in a conducting state is the time of duration of the signal from the amplifier 12, typically 20 msec., plus a time determined by the charging of the capacitor 62, which is about 80 msec., with the component values to be given hereinafter. The capacitor 62 is discharged rapidly after cessation of the amplifier signal (in about 1 msec.) through the transistor 63. This is turned hard on when its base goes positive (due to the action of the potentiometer network 65, 66 and 64) when the transistor 56 and the transistor 57 switch off.

When the pulses from the amplifier 12 are positive, the multivibrator 15 is triggered by the transistor 59 and the associated phase inverter 60. These both bottom and switch the transistor 56 into conduction as before.

The resetting circuit 17 comprises a transistor 70 coupled to the multivibrator 15 by the capacitor 16 at the collector of the transistor 57. The frequency shift line 22 connects a transistor 67 to a field effect transistor (F.E.T.) 71 in the oscillator 19. The oscillator 19 includes two capacitive elements 72 and 73, a constant current generator 74 connected to discharge the capacitors 72 and 73, and a rapid charge device 76 for charging the capacitors 72 and 73.

While the transistor 56 and the transistor 57 remain in the quiescent state, the transistor 66 remains non-conducting. Therefore the transistor 71 appears to be a low resistance (typically 200 ohm) between drain and source, the gate being connected to the drain by a resistor 77. Thus in this state the capacitor 72 is effectively in parallel with the capacitor 73 and the constant current generator 74. These elements are in series with the charge device 76, and with the series combination of the transistor 70 and a diode 83. The diode 83 acts as a constant voltage device which is required to ensure that the voltage to which the capacitors 72 and 73 are charged at the commencement of the oscillator cycle (as will be explained hereafter) is the same whether the charging takes place through the transistor 70 or the device 76.

The charge device 76 is a silicon controlled switch, sometimes called a programmable unijunction transistor having anode, gate and cathode electrodes. The capacitors 72 and 73 discharge through the transistor 74 of the current generator to the voltage at which device 76 conducts spontaneously, which voltage is reached when its anode is about 0.5V more positive than its gate. The switch 76 then charges the capacitors 72 and 73 rapidly through the anode gate path which includes a resistor 79 in series. Thus a sawtooth waveform is produced across the capacitors 72 and 73. If the transistor 57 is switched on before the capacitors 72 and 73 discharge sufficiently for the switch 76 to conduct, the base of the transistor 70 will be driven positive through the differentiating network of the capacitor 16 and two resistors 80, 81 in series, thus causing the transistor 70 to conduct and rapidly to charge the capacitors 72 and 73 through the diode 83. The transistor 70 remains in conduction long enough (for example 4 msec.) to ensure the capacitors 72 and 73 are charged to within about 0.5V of the supply voltage.

Under free running conditions, the capacitors 72 and 73 charge through the transistor 76. The sawtooth voltage across the capacitors 72 and 73 has a duration of about 850 msec. corresponding to a pulse rate of 70/min. The voltage excursion on the capacitors 72 and 73 is between −4.9 and −1.7V. At the end of each sawtooth the charge current of the capacitors 72 and 73 produces a pulse across the resistor 79 which triggers the pulse generator 20. The output of the latter is fed to the terminal 11 and thence to the heart electrode to stimulate ventricle contraction. Thus in the absence of input pulses from amplifier 12, or if the pulses occur at less than 70/min, output stimulating pulses are generated at 70/min.

When a stimulation pulse is fed from the generator 20 to the terminal 11, it will be detected by the amplifier 12 and will produce switching of the multivibrator 15 by the trigger circuit 13. It is therefore necessary to prevent this artificial impulse from operating the resetting circuit 17. This prevention is achieved by a switch comprising a transistor 100 connected between the base of the transistor 70 and the −5.4V rail. The base of the transistor 100 is connected by way of an R-C network 97, 98 and 99 to a suitable point in the pulse generator 20 (such as an emitter follower) which produces a positive voltage pulse while a stimulating pulse is being produced. This positive pulse charges the capacitor 99 and causes the transistor 100 to conduct for the duration of the stimulating pulse, and for approximately 40 msec. thereafter while the capacitor 99 discharges through the resistors 97 and 98.

If, during a sawtooth, an input pulse is received which triggers the multivibrator, then the capacitors 72, 73 are charged through the transistor 70 and the diode 83, and no output pulse is generated across the resistor 79. Thus the pacer output is inhibited.

The transistor 67 is brought into conduction 4 m.sec. after the multivibrator is switched on, and is maintained in conduction while the multivibrator is on. The collector current of the transistor 67 flows through the resistor 77 causing the gate of the transistor 71 to come within about 100 mV of the −5.4V line. The source of the transistor 71 is initially held at 0V by virtue of the capacitor 72 having been charged just prior to this sequence. Thus the transistor 71 is cut off and the capacitor 72 can no longer discharge into the current generator 74. The sawtooth voltage waveform appearing across the capacitor 73 now rises at a faster rate as current in the transistor 74 remains constant. If the multivibrator switches off before the conducting level of the device 76 has been reached, the transistor 71 returns to a low drain-source resistance as the transistor 67 ceases conducting. The maintained charge on the capacitor 72 is now partially transferred to the capacitor 73 and the sawtooth waveform drops sharply negative until charge transfer is complete. Once this occurs the sawtooth waveform recommences but at a slower rate of rise as the capacitors 72 and 73 are now both being discharged by the transducer 74.

Should the input pulse rate exceed about 360 pulses/min. (condition A), the circuit operates as follows. On the receipt of a positive or negative pulse, the multivibrator 15 is switched on. On the completion of the pulse, the capacitor 62 begins to charge negatively towards −4.9V, causing the current in the transistor 56 to decrease slowly, the transistor 57 still remaining bottomed. If another pulse is received from the amplifier 12 before the transistors 56 and 57 are cumulatively switched off, the base of the transistor 56 and one side of the capacitor 62 are returned to about −0.1V by the switching action of the bottomed transistor 58 or the transistor 60, depending whether the input pulse is negative or positive. As the capacitor 62 has a charge contained it will now rapidly discharge through either the transistor 58 or the transistor 60 and the diode 82. To prevent the collector of the transistor 57 swinging excessively positive (by the charged capacitor 62 being rapidly taken positive) a diode 82 limits the positive excursion to about 0.75V. Thus a low impedance path is maintained for the discharge of the capacitor 62. The collector voltage of the transistor 57 has remained at about −0.1V, and the transistor 57 has continued to be bottomed, since the original input pulse. Therefore no further positive pulses have been available to switch on the transistor 70 through the AC coupling of the capacitor 16 and the resistor 80, and the oscillator is unable to be reset by a second input pulse. Likewise, as the multivibrator has now remained switched on, the transistor 67 remains switched conducting and so keeps the transistor 71 non-conducting to isolate the capacitor 72 from the OV line. Thus the oscillator frequency is now controlled only by the capacitor 73 discharging into the transistor 74. If the frequency of input pulses is maintained, the oscillator cannot be reset and the device 76 will conduct approximately 600 msec. after receipt of the first input pulse. Thus while a high input frequency is maintained, the pacer will stimulate the heart at a fixed high rate of approximately 100/min.

A transistor 84 is included with the AC coupling capacitor 16, resistor 80 and resistor 81 so that when the multivibrator finally switches off, the capacitor 16 is rapidly discharged. Without the transistor 84, the discharge path for the capacitor 16 would be through the resistors 80, 81, 69, 66 and 65. Once the transistor 57 becomes non-conducting, the base of the transistor 84 becomes positive with respect to its emitter and collector current flows discharging the capacitor 16.

The capacitor 73 has been described as being connected between the anode of the device 76 and the OV line. Alternatively, it may be advantageous to connect the capacitor 73 between the anode of the device 76 and the −5.4V line, in order to avoid drawing heavy peak current pulse from the voltage supply. The action of the circuit will remain the same in effect.

A number of biassing and other elements are indicated by reference numerals 85 to 96, but are not described in detail. By way of example, the values used for various components may be as shown in the following table.

| Reference Numeral | Value or Type |
| --- | --- |
| 16 | .022 microfarad |
| 56 | n-p-n low level transistor |
| 57 | p-n-p low level transistor |
| 58 | p-n-p low level transistor |
| 59 | n-p-n low level transistor |
| 60 | p-n-p low level transistor |
| 61 | 470 K.ohm |
| 62 | .047 microfarad |
| 63 | n-p-n low level transistor |
| 64 | 2.2 M.ohm |
| 65 | 1 M.ohm |
| 66 | 470 K.ohm |
| 67 | n-p-n low level transistor |
| 68 | .047 microfarad |
| 69 | 470 K.ohm |
| 70 | n-p-n low level transistor |
| 71 | field effect transistor |
| 72 | 0.1 microfarad |
| 73 | 0.22 microfarad |
| 74 | p-n-p low level transistor |
| 75 | p-n-p low level transistor |
| 76 | p-n-p-n silicon control switch |
| 77 | 1 M.ohm |
| 78 | 470 K.ohm |
| 79 | 220 K.ohm |
| 80 | 100 K.ohm |
| 81 | 100 K.ohm |
| 82 | silicon signal diode |
| 83 | silicon signal diode |
| 84 | n-p-n low level transistor |
| 85 | 2.2 M.ohm |
| 86 | .0068 microfarad |
| 87 | .0068 microfarad |
| 88 | 2.2 M.ohm |
| 89 | 470 K.ohm |
| 90 | 500 K.ohm |
| 91 | 330 K.ohm |
| 92 | 220 K.ohm |
| 93 | 470 K.ohm |
| 94 | 100 K.ohm |
| 95 | 2.2 M.ohm |
| 96 | 1 microfarad |
| 97 | 270 K.ohm |
| 98 | 470 K.ohm |
| 99 | 0.1 microfarad |
| 100 | n-p-n low level transistor |

In an alternative arrangement, the diode 83 may be removed with the result that the capacitors 72 and 73 are charged to a larger negative voltage through the transistor 70 after stimulation by an artificial pulse, than through the device 76 after stimulation by a natural heartbeat. The result of this is that the waiting time, before the pacer will start to stimulate, will be increased to a time corresponding to a natural sinus rhythm of approximately 57/min.

We claim:
1. An inhibited demand pacer comprising
   means for generating stimulating pulses suitable for stimulating heartbeats,
   means for monitoring natural heartbeats by detecting electrical impulses, and
   means for inhibiting the generating means during detection of electrical impulses above a first threshold frequency and below a second threshold frequency including means establishing said first and second threshold frequencies,
   said generating means, in the absence of detection of electrical impulses at frequencies higher than the first threshold frequency, generating stimulating pulses at a first, normal stimulating frequency, and, in response to detection by the monitoring means of electrical impulses above the second threshold frequency, generating stimulating pulses at a second, stimulating frequency higher than the first, normal stimulating frequency.

2. A pacer according to claim 1 in which the monitoring means includes an amplifier for passing a selected frequency bandwidth of the natural heartbeat electrical waveform, and a trigger circuit connected to said amplifier for triggering the inhibiting means in response to detection of a predetermined feature of the heartbeat waveform.

3. A pacer according to claim 1 in which the generating means includes an oscillator having periodic cycle at the end of which a stimulating pulse is generated, and in which the inhibiting means includes means for resetting the oscillator back to the commencement of its said periodic cycle to prevent the generation of a stimulating pulse.

4. A pacer according to claim 3 in which the inhibiting means includes a monostable multivibrator connected to be triggered from its quiescent state to its on state by the detection of an electrical impulse by the monitoring means, the output of the multivibrator being fed to the resetting means to operate the resetting means upon switching of the multivibrator from one state to another.

5. A pacer according to claim 4 in which the construction and period of the multivibrator is such that the detection of electrical impulses by the monitoring means above the second frequency threshold maintains the multivibrator in its on state to suspend operation of the resetting means.

6. A pacer according to claim 5 in which the inhibiting means includes means responsive to the multivibrator being maintained in the on state longer than a predetermined time interval, and operative upon occurrence of such a state to feed to the generating means a frequency shift signal causing the generating means to generate stimulating pulses at the said higher stimulating frequency.

7. An inhibited demand pacer comprising
means for generating stimulating pulses suitable for stimulating heartbeats,
including an oscillator having a periodic cycle at the end of which a stimulating pulse is generated two capacitive elements means for transferring charge into or out of the capacitive elements at a substantially constant rate, two additional means connected to transfer substantially instantaneously charge out of or into the capacitive elements depending upon the sense of transfer provided by the said transferring means, and means for isolating one of the capacitive elements, one of the additional means being arranged to conduct when the charge across it reaches a predetermined level and by such conduction to cause the generation of a stimulating pulse, and the other additional means being connected to receive the output of the resetting means and being arranged to conduct on receipt of a signal from the resetting means, the means for isolating one of the capacitors operating during detection by the monitoring means
means for monitoring natural heartbeats by detecting electrical impulses, and
means for inhibiting the generating means during detection of electrical impulses above a first threshold frequency and below a second threshold frequency, including means for establishing said first and second threshold frequencies and
means for resetting the oscillator back to the commencement of its periodic cycle to prevent the generation of a stimulating pulse.

8. A pacer according to claim 1 in which the first threshold frequency is a frequency in the range 55 to 75 pulses per minute.

9. A pacer according to claim 1 in which the second threshold frequency is a frequency in the range 200 to 400 pulses per minute.

10. A pacer according to claim 1 in which the said normal stimulating frequency is a frequency in the range 65 to 75 pulses per minute.

11. A pacer according to claim 1 in which the said higher stimulating frequency is a frequency in the range 95 to 110 pulses per minute.

12. A pacer according to claim 1 in which the second threshold frequency is 300 pulses per minute, the normal stimulating frequency is 70 pulses per minute and the higher stimulating frequency is 100 pulses per minute.

13. A pacer according to claim 1 in which the first threshold frequency is equal to the normal stimulating frequency.

14. An inhibited demand pacer comprising:
means for generating stimulating pulses at a first normal stimulating frequency and at a second higher stimulating frequency suitable for stimulating heartbeats,
means for monitoring natural heartbeats by detecting electrical impulses,
inhibiting means responsive to said monitoring means for inhibiting said generating means during detection of electrical impulses above a first threshold frequency and below a second threshold frequency, and for supplying a control signal to said generating means in response to detection by said monitoring means of electrical impulses above said second threshold frequency, said generating means being operative in response to said control signal to generate stimulating pulses at a second stimulating frequency higher than said first, normal stimulating frequency, said inhibiting means including means for establishing said first and second threshold frequencies.

15. A pacer according to claim 14, in which the monitoring means includes an amplifier for passing a selected frequency bandwidth of the natural heartbeat electrical waveform, and a trigger circuit responsive to said amplifier for triggering the inhibiting means in response to detection of a predetermined feature of the heartbeat waveform.

16. A pacer according to claim 14, in which the generating means includes two capacitive elements, charge transferring means for transferring charge into or out of the capacitive elements at a substantially constant rate, first and second devices connected to transfer substantially instantaneously charge out of or in to the capacitive elements depending upon the sense of transfer provided by said charge transferring means, means for isolating one of the capacitive elements, pulse generating means responsive to said first device and arranged to generate a stimulating pulse when said first device conducts, said first device being arranged to conduct when the voltage across it reaches a predetermined level, and said second device being connected to receive the output of the resetting means, said means for isolating one of said capacitors being arranged responsive to the monitoring means to operate during detection by the monitoring means of impulses above said second threshold frequency.

\* \* \* \* \*